United States Patent
Civiero et al.

(10) Patent No.: US 10,371,234 B2
(45) Date of Patent: Aug. 6, 2019

(54) BICYCLE CHAIN AND MOTION TRANSMISSION SYSTEM COMPRISING SUCH A CHAIN

(71) Applicant: Campagnolo S.r.l., Vicenza (IT)

(72) Inventors: Mirco Civiero, Montecchia di Crosara (IT); Mauri Feltrin, Nanto (IT); Filippo Bisarello, Costabissara (IT)

(73) Assignee: Campagnolo S.r.l., Vicenza (IT)

( * ) Notice: Subject to any disclaimer, the term of this patent is extended or adjusted under 35 U.S.C. 154(b) by 376 days.

(21) Appl. No.: 15/343,906

(22) Filed: Nov. 4, 2016

(65) Prior Publication Data

US 2017/0138439 A1    May 18, 2017

(30) Foreign Application Priority Data

Nov. 6, 2015 (IT) .............................. UB2015A4794

(51) Int. Cl.
 *B62M 9/10* (2006.01)
 *F16G 13/06* (2006.01)

(52) U.S. Cl.
 CPC ............... *F16G 13/06* (2013.01); *B62M 9/10* (2013.01)

(58) Field of Classification Search
 CPC ........... F16G 13/06; B62M 9/10; B21L 9/065; B21L 21/00; B25B 27/22
 USPC ........................................................ 474/231
 See application file for complete search history.

(56) References Cited

U.S. PATENT DOCUMENTS

| | | | | |
|---|---|---|---|---|
| 3,359,815 A | * | 12/1967 | Mueller | B21L 15/005 474/231 |
| 3,595,097 A | * | 7/1971 | Araya | F16G 13/06 474/231 |
| 4,265,134 A | * | 5/1981 | Dupoyet | F16G 13/06 474/231 |
| 4,428,739 A | * | 1/1984 | Shimano | F16G 13/06 305/106 |
| 4,642,078 A | * | 2/1987 | Dupoyet | F16G 13/06 474/206 |
| 4,978,327 A | * | 12/1990 | Wu | F16G 13/06 474/228 |
| 5,098,349 A | * | 3/1992 | Wu | F16G 13/06 474/206 |

(Continued)

FOREIGN PATENT DOCUMENTS

DE    202010008814 U1    12/2010

OTHER PUBLICATIONS

Italian Search Report and Written Opinion in Italian Application No. UB2015A004794, dated Jul. 21, 2016, with English translation.

*Primary Examiner* — Henry Y Liu
(74) *Attorney, Agent, or Firm* — Volpe and Koenig, P.C.

(57) ABSTRACT

A bicycle chain having an alternate succession of outer links and inner links connected to each other at respective end portions thereof. Each outer link and inner link comprises two respective plates arranged parallel to and spaced apart from one another to define a housing space for a tooth of a sprocket or toothed wheel. Each plate of each outer link has, at a central portion thereof, a first thickness. Each plate of each inner link has, at a central portion thereof, a second thickness. Each plate of each outer link and inner link has, at said respective end portions, a third thickness that is less than the sum of said first thickness and second thickness.

14 Claims, 11 Drawing Sheets

(56) References Cited

U.S. PATENT DOCUMENTS

| | | | | |
|---|---|---|---|---|
| 5,203,745 A * | 4/1993 | Wang | F16G 13/06 474/206 |
| 5,322,482 A * | 6/1994 | Wang | F16G 13/06 474/206 |
| 5,322,483 A * | 6/1994 | Wang | F16G 13/06 474/206 |
| 5,591,095 A * | 1/1997 | Wu | F16G 13/06 474/231 |
| 5,954,604 A * | 9/1999 | Nakamura | B62M 9/10 474/158 |
| 6,110,064 A * | 8/2000 | Guichard | F16G 13/06 474/230 |
| 7,325,391 B1 * | 2/2008 | Oishi | F16G 13/06 59/5 |
| 7,427,251 B2 * | 9/2008 | Reiter | F16G 13/06 474/206 |
| 7,437,870 B2 * | 10/2008 | Wu | F16G 13/06 474/206 |
| 7,473,198 B2 * | 1/2009 | Kamada | F16G 13/06 474/230 |
| 7,749,119 B2 * | 7/2010 | Meggiolan | B21L 9/065 474/227 |
| 7,914,410 B2 * | 3/2011 | Oishi | F16G 13/06 474/220 |
| 7,946,941 B2 * | 5/2011 | Oishi | F16G 13/06 474/206 |
| 8,066,604 B2 * | 11/2011 | Righi | F16G 13/06 474/206 |
| 8,734,280 B2 * | 5/2014 | Oishi | F16G 13/06 474/230 |
| 8,821,330 B2 * | 9/2014 | Dal Pra' | B62M 9/10 474/160 |
| 8,905,878 B2 * | 12/2014 | Loy | B62M 9/10 474/160 |
| 9,541,159 B2 * | 1/2017 | Wang | F16G 13/06 |
| 9,939,045 B2 * | 4/2018 | Fukumori | F16G 13/06 |
| 10,053,186 B2 * | 8/2018 | Braedt | B25B 27/0071 |
| 10,059,400 B2 * | 8/2018 | Tokuyama | B62M 9/10 |
| 2003/0022747 A1 * | 1/2003 | Meggiolan | B21L 9/065 474/230 |
| 2005/0202914 A1 * | 9/2005 | Reiter | F16G 13/06 474/206 |

* cited by examiner

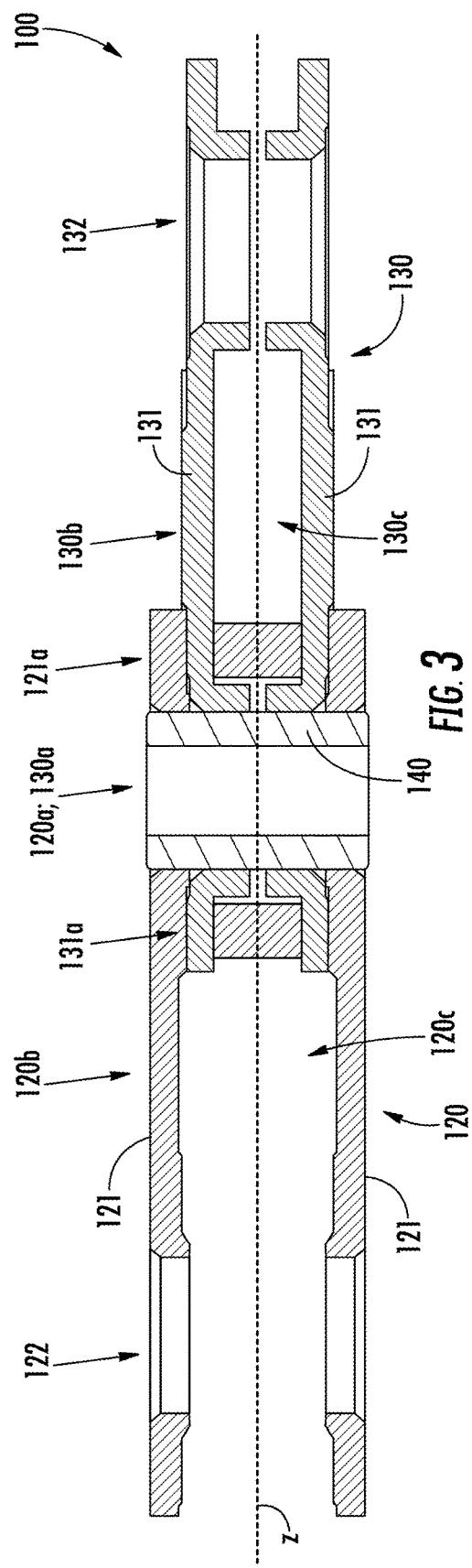

BICYCLE CHAIN AND MOTION TRANSMISSION SYSTEM COMPRISING SUCH A CHAIN

CROSS REFERENCE TO RELATED APPLICATION(S)

This application claims the benefit of Italian Application No. UB2015A004794, filed on Nov. 6, 2015 and incorporated herein by reference as if fully set forth.

FIELD OF INVENTION

The present invention relates to a bicycle chain.

The invention also relates to a motion transmission system for a bicycle comprising the aforementioned chain.

BACKGROUND

Throughout the present description and in the subsequent claims, the expression "motion transmission system" is used to indicate the assembly of at least some of the components which act for the transmission of the motion, imparted by the cyclist through pedaling, to the rear wheel of the bicycle.

As known, the motion transmission system of a bicycle comprises a pair of crank arms, on which the cyclist exerts a propulsive thrust by pedaling, one or more driving toothed wheels, set in rotation by direct coupling with the crank arms, and one or more driven toothed wheels (hereinafter "sprockets") coupled with a rear wheel of the bicycle through a hub and set in rotation by the driving toothed wheels through a chain.

The hub comprises a first body rigidly constrained to the rim of the bicycle rear wheel typically through a plurality of spokes, and a second body rigidly coupled with the sprockets and capable of rotating freely with respect to the first body in a direction of rotation and of dragging it in rotation in the opposite direction, thus applying the forward motion to the rear wheel. In the technical jargon, this second body is called a "freewheel body".

The assembly of sprockets mounted on the freewheel body is commonly called a "sprocket assembly".

The chain typically consists of a succession of links, each normally consisting of a pair of mutually facing plates spaced apart to define a space for inserting a tooth of a toothed wheel and/or of a sprocket. The plates of a link are rotatably coupled with the plates of the next link through a rivet. Such a coupling is obtained by arranging the end portions of the plates of a link (hereinafter "outer plates" and "outer link") over the end portions of the plate of the subsequent link (hereinafter "inner plates" and "inner link") and by inserting the rivet at holes specifically provided on the outer plates and on the corresponding inner plates. A bush is provided around the rivet, such a bush being capable of rotating freely with respect to the rivet. Flange portions of the inner plates are arranged between the rivet and the bush, such flange portions extending towards the inside of the inner link.

A chain having such a geometry will be indicated hereinafter as "conventionally-shaped chain".

Throughout the present description and in the subsequent claims, the following definitions will be used.

The terms "outer" and "inner" are used with reference to a longitudinal axis of symmetry of the chain, when the chain is arranged open and straight on a plane. Therefore, "outer link" indicates a link whose (outer) plates are distant from the aforementioned axis of symmetry more than the (inner) plates of the "inner link".

The expression "end portion" of a link or plate of the chain is used to indicate the end portion of the link or plate along a direction parallel to the aforementioned longitudinal axis of symmetry. Such an "end portion" is therefore the portion of link or plate that, when the chain is mounted, is radially juxtaposed to (in the case of an outer link or plate) or arranged between (in the case of an inner link or plate) a portion of link or plate of the subsequent link.

The expression "central portion" of a link or plate is used to indicate the portion of the link or plate arranged between the two opposite end portions of the same link or plate.

The term "thickness" of a plate is used to indicate the thickness taken on a plane perpendicular to the aforementioned longitudinal axis of symmetry. With particular reference to the inner plates, the thickness as defined here is taken on a portion of plate that does not comprise the aforementioned flange portions.

The expression "resistant transverse section" of the chain or link is used to indicate the resistant section of the outer or inner chain or link, taken at the aforementioned perpendicular plane and defined only by the thickness of the plates of the link(s) at said perpendicular plane. The resistant transverse section thus defined does not therefore take into account the contribution given by further structural elements in addition to the links, like for example the bushes arranged around the rivets that join two adjacent links of the chain.

The expression "maximum thickness of the chain" is used to indicate the distance between the outer surfaces of the outer plates of the chain.

Since the bicycle is a transport device based on the muscle propulsion, it is necessary for the system for the power transmission from the cyclist to the driving wheel to be the least tiring possible.

As known, the combination of a toothed wheel with a small diameter and a sprocket with a large diameter allows difficult climbs to be tackled with agility. However, the same combination, in a flat or downhill route, is disadvantageous since it wastes the energy of the cyclist, who is forced to pedal at a fast rate while the bicycle moves forwards at low speed.

In order to adapt the aforementioned combination to the route to be tackled, it is known to provide the bicycle with a plurality of toothed wheels and with a plurality of sprockets, which can be combined with each other depending on the requirements, through suitable gearshifting devices, thus defining a plurality of gear ratios.

With particular reference to sprockets, they are spaced apart from one another by respective spacers. Such spacers have the task of defining a space between two adjacent sprockets which is suitable for allowing the engagement of the chain on a sprocket and the passage of the chain from one sprocket to another.

Over the years the number of sprockets used has progressively increased.

In order to minimize the weight and be able to mount an increasing number of sprockets on the freewheels already on the market (typically provided to house a smaller number of sprockets), the increased number of sprockets has typically been accompanied by a reduction in thickness of the sprockets, and/or of the spacers and/or of the chain.

The Applicant has designed a sprocket assembly comprising twelve sprockets. In order to be able to continue to use freewheels already used with ten or eleven sprockets, the Applicant has reduced the space between each pair of consecutive sprockets, so as to obtain a sprocket assembly (of twelve sprockets) having a length which is compatible with the current construction standards of frames and bicycle components.

The Applicant has observed that the aforementioned sprocket assembly requires the use of a chain having a reduced maximum thickness.

The Applicant has however observed that a reduction of the maximum thickness of the chain could have led to an undesired reduction of the structural strength thereof.

The Applicant has therefore considered how to be able to reduce the maximum thickness of the chain without compromising the structural strength thereof.

In this respect, the Applicant has verified that the structural strength of the chain is mainly influenced by the thickness of the central portions of the plates of the links of the chain. Indeed, it is at such central portions that the Applicant found yielding of the chain during tensile strength and lateral load resistance tests.

The Applicant has therefore realized that it is possible to obtain the desired reduction in maximum thickness of the chain, without compromising the structural strength thereof, by reducing the thickness of the plates of the inner and/or outer links only at the end portions of such links. In this way, it is possible to assemble a chain wherein, being equal the thickness of the central portions of the links (and therefore being substantially equal the structural strength) the two outer plates are space apart from each other at a shorter distance than in a conventional chain, thus obtaining the desired reduction of the maximum thickness of the chain.

The solution identified by the Applicant goes contrary to the tendency often followed in the past of reinforcing (thus providing an increased thickness) the plates of the inner and/or outer links of the chain at the end portions of such links.

The Applicant has in practice reversed this tendency.

SUMMARY

The present invention therefore relates, in a first aspect thereof, to a bicycle chain, comprising an alternate succession of outer links and of inner links, connected to each other at respective end portions, each outer link and inner link comprising two respective plates arranged parallel and spaced apart from one another to define a space for housing a tooth of a sprocket or toothed wheel, wherein:

each plate of each outer link has, at a central portion thereof, a first thickness;

each plate of each inner link has, at a central portion thereof, a second thickness;

each plate of each outer and inner link has, at said respective end portions, a third thickness;

characterized in that said third thickness is smaller than the sum of said first thickness and second thickness.

Advantageously, the plates of the chain of the invention have, when compared with the plates of conventional chains, a reduced thickness only at the end portion of the plates (that is in those areas that contribute little to the structural strength of the chain) and not also in the central portions of the plates (that is in those areas that contribute a lot to the structural strength of the chain). Such a provision makes it possible to reduce the maximum thickness of the chain without compromising the structural strength thereof in operation.

The invention identified by the Applicant has different preferred embodiments, described herein below.

The desired reduction of the maximum thickness of the chain can be obtained by reducing the thickness of the end portions of only the inner links of the chain, or of only the outer links of the chain, or of both the inner links and the outer links.

In first preferred embodiments of the invention, each plate of each inner link has, at an end portion thereof, a thickness smaller than that at a central portion thereof.

Preferably, each plate of each outer link has, at an end portion thereof, a thickness greater than that at a central portion thereof.

In this case, the desired reduction of the maximum thickness of the chain is obtained by reducing the thickness of the end portions of the plates of only the inner links of the chain. The plates of the outer links, on the other hand, have an increased thickness at the respective end portions, so as not to excessively reduce the resistant transverse section of the chain in the mutual coupling area of the inner and outer plates.

In the aforementioned first embodiments, each plate of each inner link has, at an end portion thereof, a thickness smaller than that of the end portion of the corresponding plate of the outer link.

In second preferred embodiments of the invention, each plate of each outer link has, at an end portion thereof, a thickness smaller than that at a central portion thereof.

Preferably, each plate of each inner link has, at an end portion thereof, a thickness greater than that at a central portion thereof.

In this case, the desired reduction of the maximum thickness of the chain is obtained by reducing the thickness of the end portions of the plates of only the outer links of the chain. The plates of the inner links, on the other hand, have an increased thickness at the respective end portions, so as not to excessively reduce the resistant transverse section of the chain in the mutual coupling area of the outer and inner plates.

In the aforementioned second embodiments, each plate of each outer link has, at an end portion thereof, a thickness smaller than that of the end portion of the corresponding plate of the inner link.

In third preferred embodiments of the invention, each plate of each inner link has, at an end portion thereof, a thickness smaller than that at a central portion thereof and each plate of each outer link has, at an end portion thereof, a thickness smaller than that at central portion thereof.

In this case, the desired reduction of the maximum thickness of the chain is obtained by reducing the thickness of the end portions both of the plates of the inner links and of the plates of the outer links of the chain. In this way, a chain is made having a further reduced maximum thickness. Despite this, such a chain has a sufficient structural strength given that the reduction in thickness does not involve the central portions of the links.

In the aforementioned third embodiments, each plate of each inner link has, at an end portion thereof, a thickness substantially equal to that of the end portion of the corresponding plate of the outer link.

Preferably, in any one of the aforementioned embodiments, each plate of each outer link has an outer surface and an inner surface and the end connection portion of each outer link is rotatably coupled with the respective end connection portion of each inner link through a rivet having a length smaller than or equal to the distance between the outer surfaces of the plates of the outer link. In this way, the rivet does not protrude with respect to the outer plates of the chain. Such a provision makes it possible to improve the gearshifting performance (that is the passage of the chain from one sprocket to the other) and to reduce noise production during such gearshifting.

In a second aspect thereof, the invention relates to a motion transmission system for a bicycle, comprising a sprocket assembly configured to be mounted on a freewheel body of a hub of a bicycle rear wheel and a chain in accordance with the first aspect of the present invention.

Such a chain can have all or only some of the preferred characteristics described above and can be made according to any one of the embodiments discussed above.

Preferably, said sprocket assembly comprises at least 12 sprockets. Thanks to the use of a chain having a reduced maximum thickness, such sprockets can advantageously be brought close to each other, so as to be able to mount them on a freewheel that satisfies the current construction standards of frames and components of mountain-bikes.

Preferably, said sprocket assembly has an axial extension equal to 40.8 mm.

Preferably, one of said sprockets has a thickness equal to 1.75 mm and the other sprockets have a thickness equal to 1.5 mm.

Preferably, said sprocket assembly comprises a plurality of spacers, each spacer being configured to be arranged between two consecutive sprockets, wherein each spacer has a thickness equal to 2.05 mm.

BRIEF DESCRIPTION OF THE DRAWING(S)

Further features and advantages of the invention will become clearer from the following description of some preferred embodiments, made with reference to the attached drawings and purely as an example and not for limiting purposes. In the attached drawings:

FIG. 1 schematically shows a longitudinal section view of a motion transmission system in accordance with the present invention, such a portion comprising a sprocket assembly mounted on a freewheel body of a hub of a bicycle rear wheel, such a sprocket assembly being engaged with a bicycle chain in accordance with the present invention;

FIG. 3 is a schematic longitudinal section view of a chain according to a first embodiment of the present invention;

DETAILED DESCRIPTION OF THE PREFERRED EMBODIMENT(S)

Figure 1:
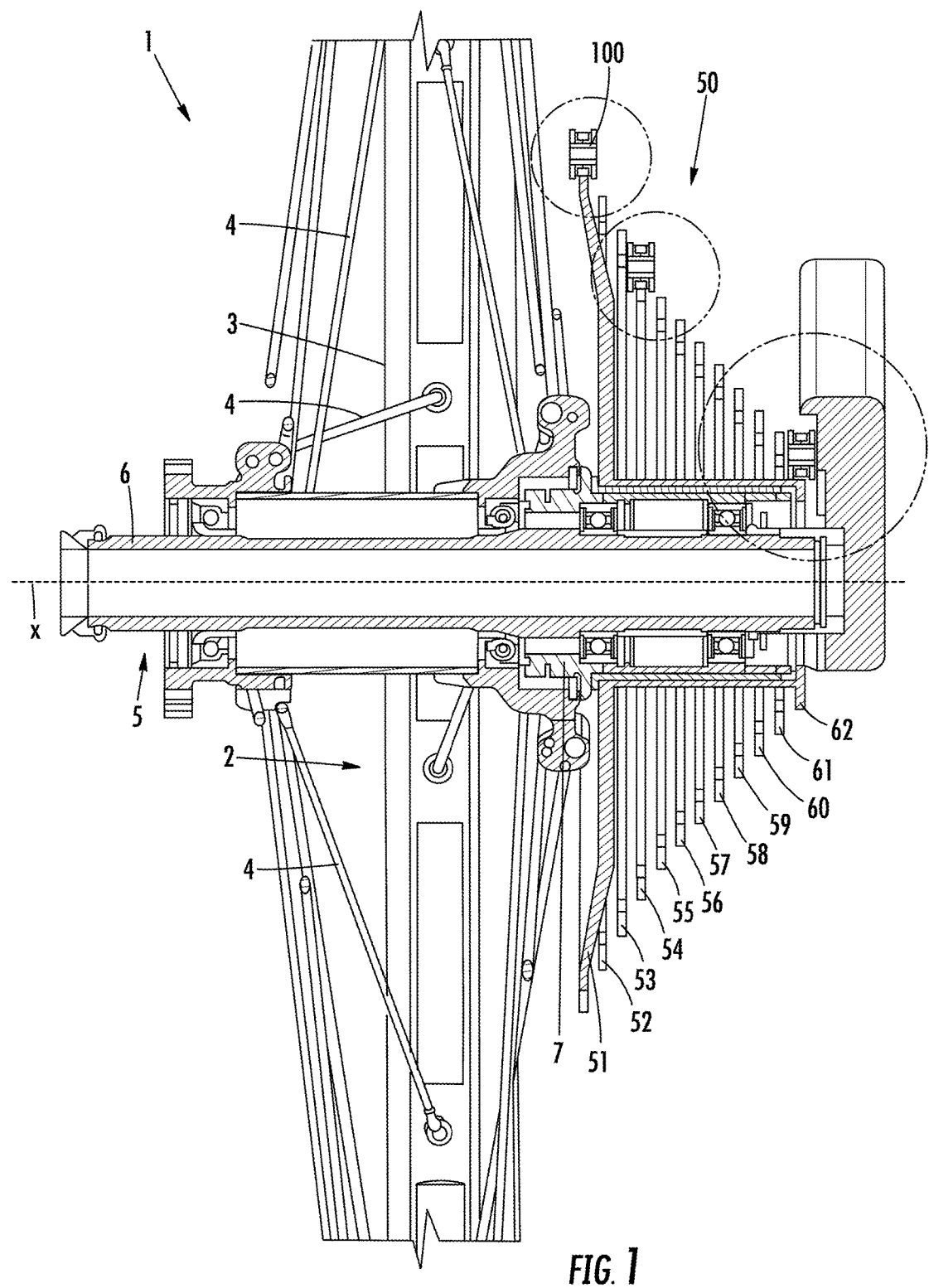

In FIG. 1, reference numeral 1 indicates a portion of a motion transmission system in accordance with the present invention. In particular, the portion illustrated in FIG. 1 is the portion of the motion transmission system coupled with a rear wheel 2 of the bicycle.

The rear wheel 2 comprises a rim 3, a plurality of spokes 4 and a hub 5. Reference numeral 4 is associated with only some of the spokes illustrated.

The hub 5 is per se known. It comprises a first body 6 coupled with the rim 2 through the spokes 4 and a second body 7 rotating integrally with the sprocket assembly 50 mounted thereon. The second body 7 is called a freewheel body since it is free to rotate with respect to the first body 6 in one direction of rotation, and drags it into rotation therewith in the opposite direction. The rotation axis is indicated with X.

The rear wheel 2 receives the motion from the motion transmission system 1. Such motion is imparted by the feet of the cyclist on a pair of crank arms (not illustrated) coupled with one or more driving toothed wheels (not illustrated) that transmit the motion to the sprocket assembly 50 through a chain 100.

The sprocket assembly 50 comprises a plurality of sprockets, each having an outer diameter and a number of teeth that is different with respect to the others. In the example illustrated in FIG. 1, there are twelve sprockets and they are indicated with reference numerals 51 to 62, starting from the sprocket 51 having the largest outer diameter up to the sprocket 62 having the smallest outer diameter.

The sprocket 62 has eleven teeth, but it could have a greater or smaller number of teeth. The sprockets 51-61 have a decreasing number of teeth (in a non-constant manner) starting from the sprocket 51, up to have in the sprocket 61 a number of teeth greater than eleven.

A gearshifting device (not illustrated) makes it possible to move the chain 100 from a condition in which it engages with one sprocket to a condition in which it engages with another sprocket. FIG. 1 shows, in respective dashed circles, the chain 100 in three possible operative positions of engagement with respective sprockets of the sprocket assembly 50.

An analogous device can also be provided in the area of the crank arms in the case in which there is more than one driving toothed wheel. In this way, the sprockets and the driving toothed wheels can be associated with each other through the chain 100 in a plurality of combinations.

In the specific and non-limiting example of FIG. 1, the sprockets 51-61 have a thickness equal to 1.5 mm, whereas the sprocket 62 has a thickness equal to 1.75 mm. Each sprocket is spaced from the adjacent sprocket by a space equal to 2.05 mm through a suitable spacer (not visible in FIG. 1). The axial extension of the sprocket assembly 50 is therefore equal to 40.8 mm; such a value falls within the limits set by the current construction standards of bicycle frames, preferably of the mountain bike type.

Figure 2:
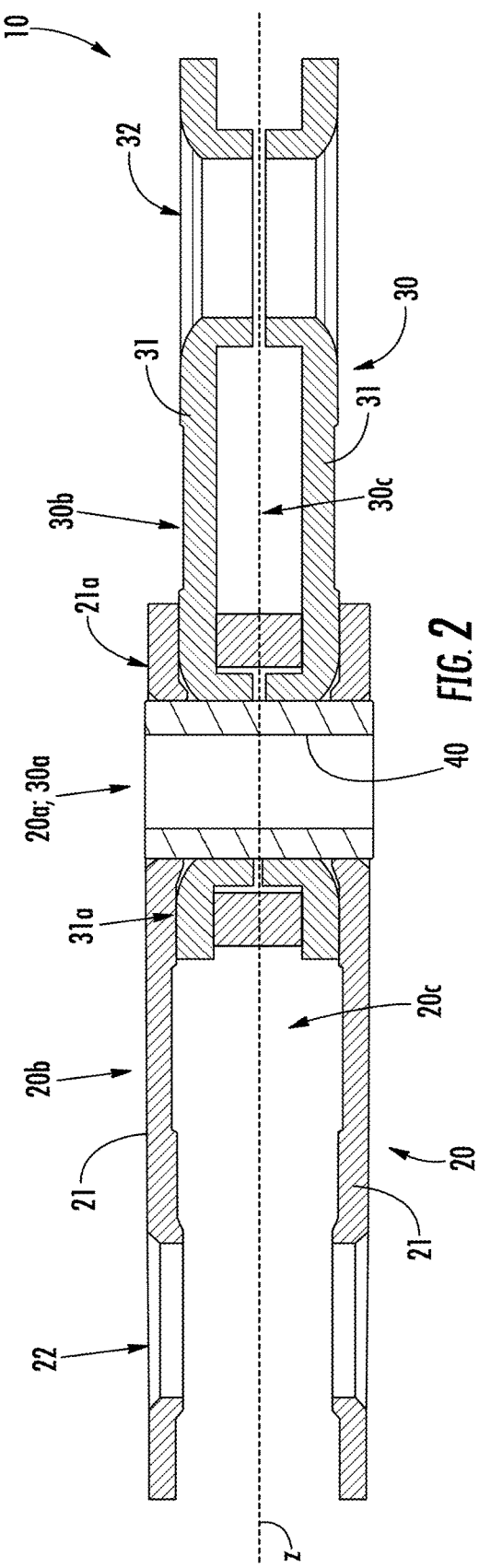
FIG. 2 is a schematic longitudinal section view of a conventional chain, used for a sprocket assembly comprising eleven sprockets.

FIG. 2 shows a chain 10 of conventional type and shape. It comprises an alternate succession of outer links 20 and of inner links 30, connected to each other at respective end connection portions 20a and 30a, and extending along a direction parallel to an axis of symmetry Z.

Figure 2A:
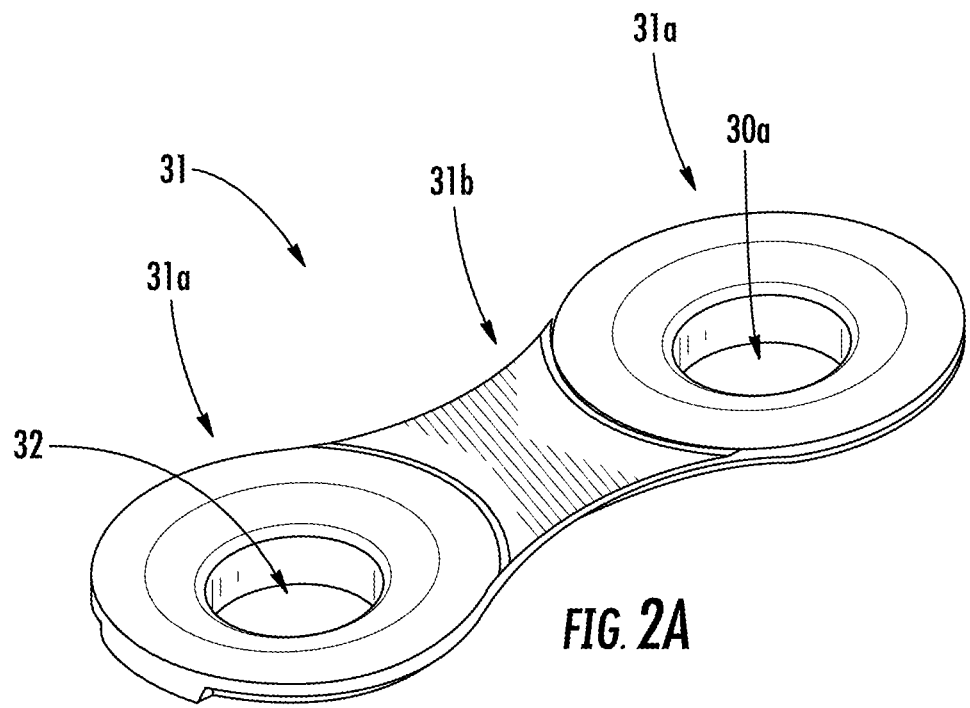
FIGS. 2a and 2b are schematic perspective views of an outer plate and of an inner plate of the chain of FIG. 2.

Each outer link comprises two outer plates 21 and each inner link 30 comprises two inner plates 31. The plates of each link are arranged parallel and spaced apart from one another to define a space 20c, 30c for housing a tooth of a sprocket. The outer plates 21 are spaced apart more than the inner plates 31 and are partially juxtaposed to the inner plates 31 at the respective end portions 21a and 31a (FIG. 2a).

A rivet 40 rotatably joins the outer plates 21 to the inner plates 31 at each of the aforementioned end portions 21a, 31a. In this respect, the outer and inner plates 21, 31 have respective holes 22, 32 at each of the aforementioned end portions 21a, 31a. The holes 22, 32 are substantially of the same diameter and aligned to house the rivets 40.

A bush 45 is provided around the rivet 40, between the two inner plates 31, such a bush 45 being capable of rotating freely around the axis of the rivet 40. Flange portions 33 of the inner plates 31 are arranged between the rivet 40 and the bush 45, such flange portions 33 being arranged around the holes 32 and extending towards the inside of the inner link 30.

The chain 10 therefore has a plurality of mutual coupling areas of the outer and inner links 20, 30 at the end connection portions 20a, 30a of the links (or at the end portions 21a, 31a of the outer and inner plates 21, 31), and a plurality of spaces 20c, 30c for housing teeth at central portions 20b, 30b of the links (or at the central portions 21b, 31b of the outer and inner plates 21, 31).

In the example illustrated in FIG. 2, the maximum thickness R of the chain 10 is equal to 5.3 mm. The thickness of each of the outer plates 21, at the central portion 21b thereof, is equal to 0.77 mm, whereas the thickness of each of the inner plates 31, at the central portion 31b thereof, is equal to 0.75 mm. The rivet 40 has a length equal to 5.45 mm and thus slightly protrudes from the outer surfaces of each of the outer plates 21.

With reference to FIG. 2a, each inner plate 31 comprises, at each of the opposite end portions 31a thereof and around each of the holes 32, an annular area having an increased thickness. Such an increased thickness is defined on the outer surface of the inner plate 31 and, in the example illustrated here, is equal to 0.05 mm. Therefore, the inner plate 31 has a portion of outer surface, defined at the opposite end portions 31a of the inner plate 31, that lies on an outermost plane with respect to the plane on which the portion of outer surface defined at the central portion of the inner plate 31 lies.

Figure 2B:
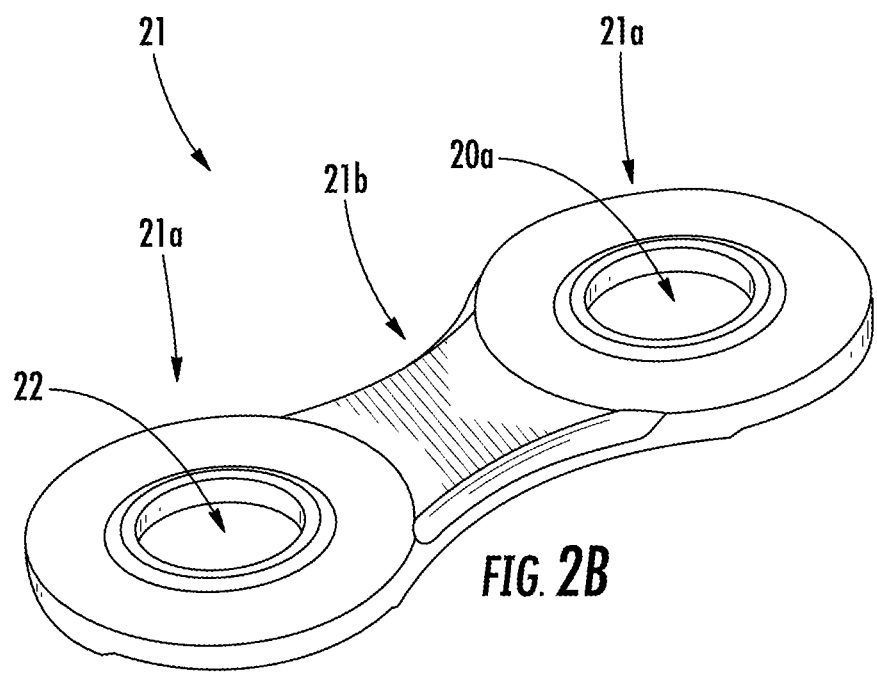

In a similar manner, with reference to FIG. 2b, each outer plate 21 comprises, at each of the opposite end portions 21a thereof and around each of the holes 22, an annular area having an increased thickness. Such an increased thickness is defined on the inner surface of the outer plate 21 and, in the example illustrated here, is equal to 0.03 mm. Therefore, the outer plate 21 has a portion of inner surface, defined at the opposite end portions 21a of the outer plate 21, which lies on an innermost plane with respect to the plane on which the portion of inner surface defined at the central portion of the outer plate 21 lies.

FIG. 3 shows a first embodiment of the chain 100 of the present invention. Such a chain 100 is of the same type and has the same shape as the chain 10 described above. Therefore the structural elements thereof corresponding to those described above with reference to the chain 10 will not be described again and will be identified with the same reference numeral used above increased by 100.

The chain 100 of FIG. 3 differs from the chain 10 only in that it has portions of reduced thickness in at least some of the portions in which the chain 10 has an increased thickness.

Specifically, the chain 100 has, at each of the end portions 131a of each of the inner plates 131, a reduced thickness with respect to that at the central portions 131b. In particular, with reference to FIG. 3a, each inner plate 131 comprises, at each of the opposite end portions 131a thereof and around each of the holes 132, an annular area having a reduced thickness. Such a reduction of thickness is defined on the outer surface of the inner plate 131. Therefore, the inner plate 131 has a portion of outer surface, defined at the opposite end portions 131a of the inner plate 131, which lies on an innermost plane with respect to the plane on which the portion of outer surface defined at the central portion of the inner plate 131 lies.

The outer plates 121 of the chain 100 are totally identical to the outer plates 21 of the chain 10. The outer plate 121 therefore comprises, at each of the opposite end portions 121a thereof and around each of the holes 122, an annular area having an increased thickness. Such an increased thickness is defined on the inner surface of the outer plate 121.

Figure 3A:
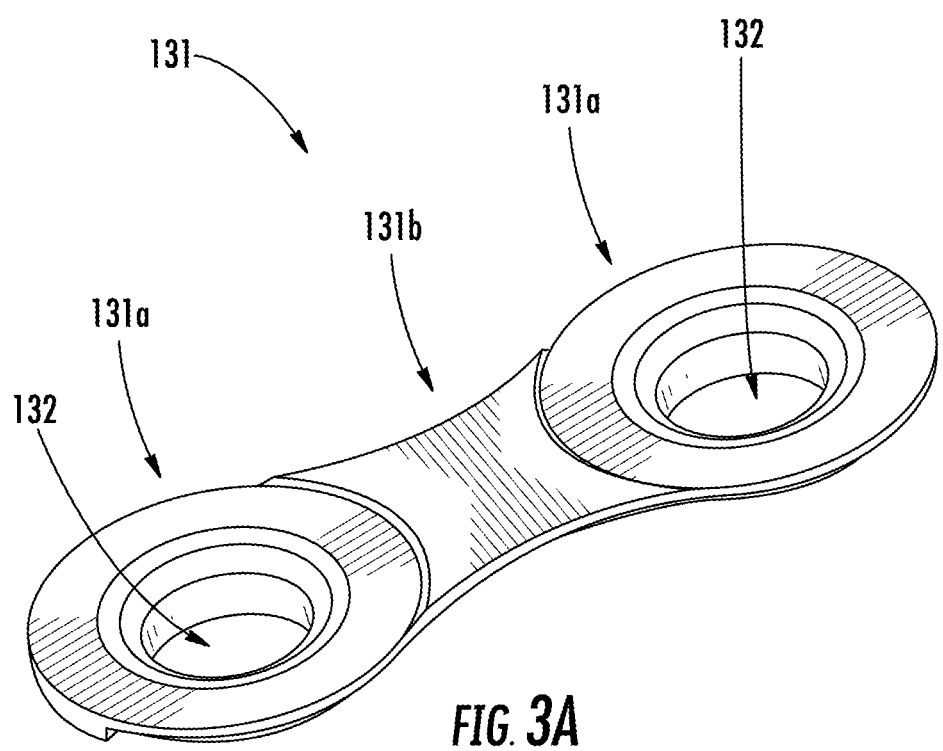
FIG. 3a is a schematic perspective view of an inner plate of the chain of FIG. 3.

In the specific and non-limiting example of FIGS. 3 and 3a, the reduction of thickness in the inner plates 131 is equal to 0.10 mm whereas the increased thickness in the outer plates 121 is equal to 0.03 mm. The inner plate 131 of each inner link 130 thus has, at the end portions 131a thereof, a thickness smaller than that of the end portions 121a of the outer plates 121.

The chain 100 of FIG. 3 therefore has a maximum thickness equal to 5 mm, thus smaller than the maximum thickness of the chain 10. The reduction of the maximum thickness with respect to the chain 10 is achieved thanks to the possibility of bringing each of the two outer plates 121 of the outer link 120 closer to each other by 0.15 mm. This is possible thanks to the aforementioned reduction of thickness at the end portions 131a of the inner plates 131 of the chain 100.

In this case, the rivets 140 have a length equal to 5.15 mm.

The sizing of the chain 100 of FIG. 3 is such that the thickness of each outer and inner plate 121, 131 of the chain 100 at the end portions 121a, 131a thereof is smaller than the sum of the thicknesses of each outer plate 121 and of each inner plate 131 of two successive links 120, 130 at the central portions 121b, 131b thereof.

Figure 4:
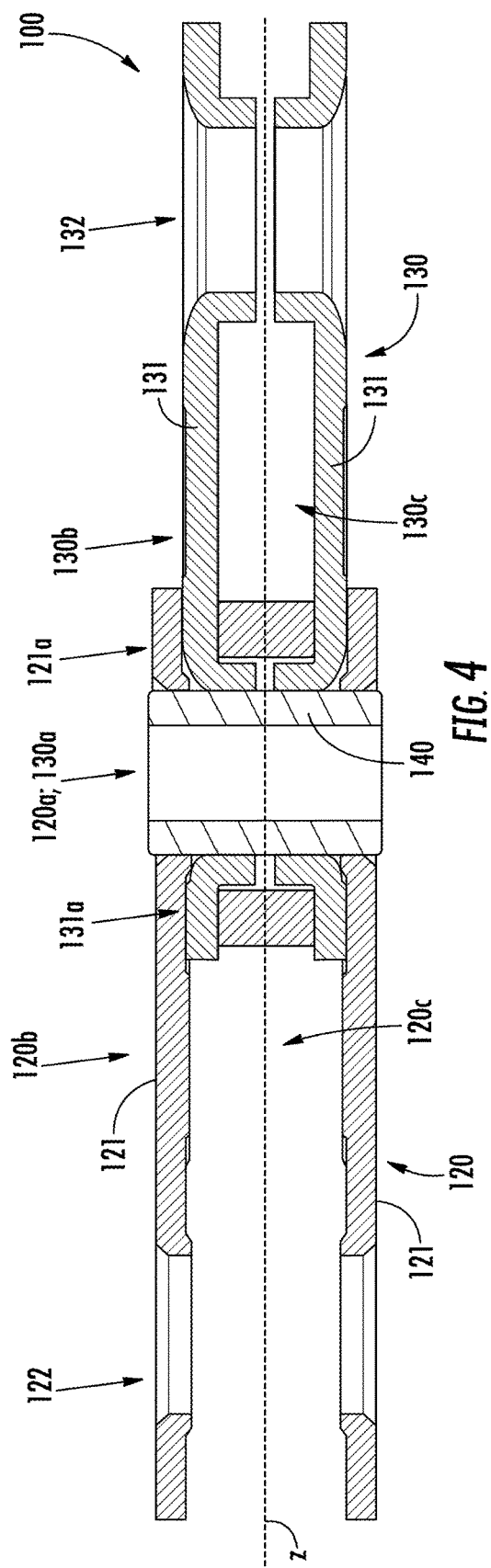
FIG. 4 is a schematic longitudinal section view of a chain according to a second embodiment of the present invention.

FIG. 4 shows a second embodiment of the chain 100 of the present invention. Such a chain 100 is also of the same type and of identical shape as the chain 10 described above. Elements identical or corresponding to those described above with reference to the chain 10 will not be described again and will be identified with the same reference numeral used above with reference to the chain 100 of FIGS. 3 and 3a.

The chain 100 of FIG. 4 also differs from the chain 10 only in that it has portions of reduced thickness in at least some of the portions in which the chain 10 has an increased thickness.

Specifically, the chain 100 of FIG. 4 has, at each of the end portions 121a of each of the outer plates 121, a reduced thickness with respect to that at the central portions 121b. In particular, with reference to FIG. 4a, each outer plate 121 comprises, at each of the opposite end portions 121a thereof and around each of the holes 122, an annular area having a reduced thickness. Such a reduction of thickness is defined on the inner surface of the outer plate 121. Therefore, the outer plate 121 has a portion of inner surface, defined at the opposite end portions 121a of the outer plate 121, which lies on an outermost plane with respect to the plane on which the portion of inner surface defined at the central portion of the outer plate 121 lies.

The inner plates 131 of the chain 100 are totally identical to the inner plates 31 of the chain 10. The inner plate 131 therefore comprises, at each of the opposite end portions 131a thereof and around each of the holes 132, an annular area having an increased thickness. Such an increased thickness is defined on the outer surface of the inner plate 131.

Figure 4A:
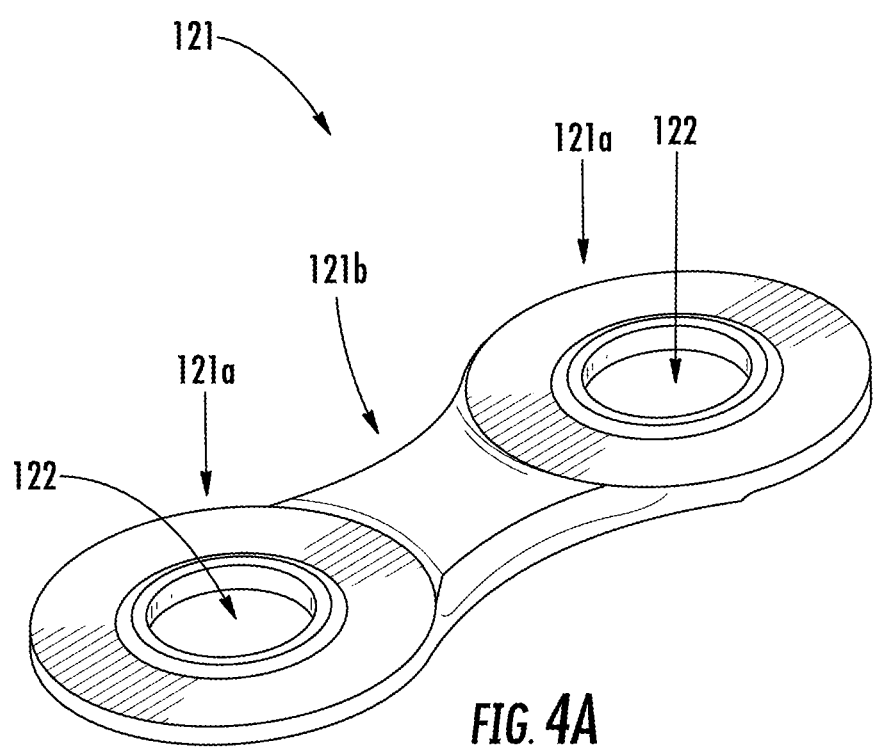
FIG. 4a is a schematic perspective view of an outer plate of the chain of FIG. 4.

In the specific and non-limiting example of FIGS. 4 and 4a, the reduction of thickness in the outer plates 121 is equal to 0.12 mm whereas the increased thickness in the inner plates 131 is equal to 0.05 mm. The outer plate 121 of each outer link 120 thus has, at the end portions 121*a* thereof, a thickness smaller than that of the end portions 131*a* of the inner plates 131.

The chain 100 of FIG. 4 therefore also has a maximum thickness equal to 5 mm, thus smaller than the maximum thickness of the chain 10. Also in this case the reduction of the maximum thickness with respect to the chain 10 is achieved thanks to the possibility of bringing each of the two outer plates 121 of the outer link 120 closer to each other by 0.15 mm. This is possible thanks to the aforementioned reduction of thickness at the end portions 121*a* of the outer plates 121 of the chain 100.

Also in this case, the rivets 140 have a length equal to 5.15 mm.

The sizing of the chain 100 of FIG. 4 is such that, also in this case, the thickness of each outer and inner plate 121, 131 of the chain 100 at the end portions 121*a*, 131*a* thereof is smaller than the sum of the thicknesses of each outer plate 121 and of each inner plate 131 of two successive links 120, 130 at the central portions 120*b*, 130*b* of such links.

Figure 5:
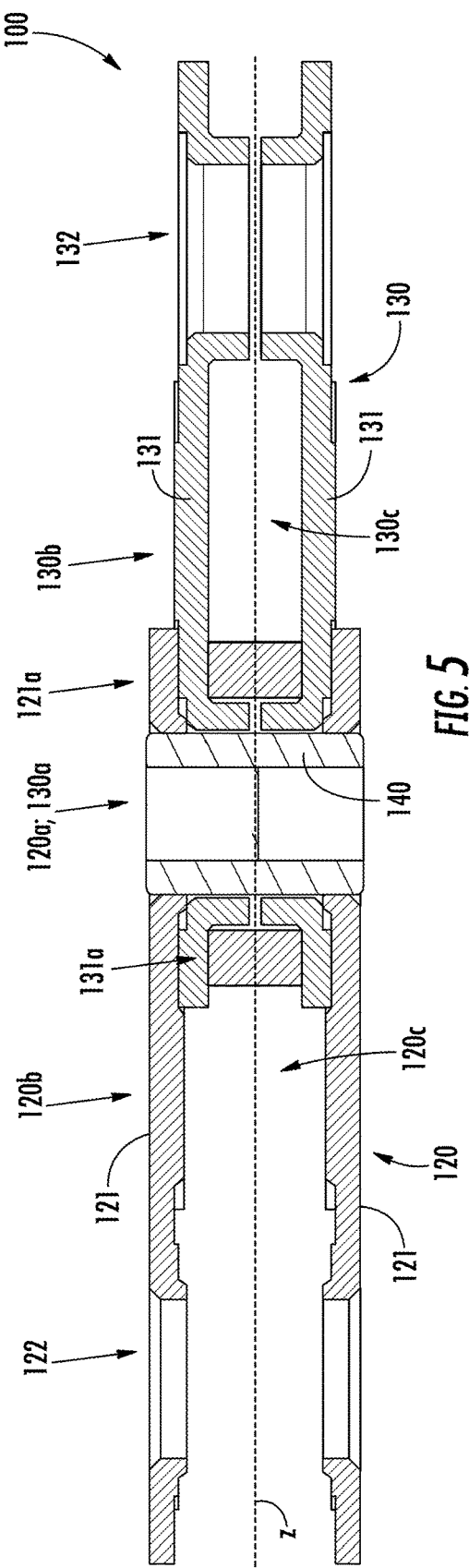
FIG. 5 is a schematic longitudinal section view of a chain according to a third embodiment of the present invention.

FIG. 5 shows a further embodiment of the chain 100 of the present invention. Such a chain 100 is also of the same type and has an identical shape as the chain 10 described above.

In the chain 100 of FIG. 5, the inner plates are identical to the inner plates 131 of the chain 100 of FIG. 3 and the outer plates are identical to the outer plates 121 of the chain 100 of FIG. 4.

The chain 100 of FIG. 5 thus has a reduction in thickness both at the end portions 121*a* of the outer plates 121 and at the end portions 131*a* of the inner plates 131.

In the specific and non-limiting example of FIG. 5, the reduction of thickness in the outer plates 121 is equal to 0.12 mm whereas the reduction of thickness in the inner plates 131 is equal to 0.10 mm. The outer plate 121 of each outer link 120 thus has, at the end portions 121*a* thereof, a thickness equal to that of the end portions 131*a* of the inner plates 131.

The chain 100 of FIG. 5 therefore has a maximum thickness equal to 4.7 mm, thus smaller both than the maximum thickness of the chain 10 of FIG. 2 and than the maximum thickness of the chains 100 of FIGS. 3 and 4.

The reduction of the maximum thickness with respect to the chain 10 is achieved thanks to the possibility of bringing each of the two outer plates 121 of the outer link 120 closer to each other by 0.30 mm. This is possible thanks to the aforementioned reduction of thickness both at the end portions 121*a* of the outer plates 121 and at the end portions 131*a* of the inner plates 131 of the chain 100.

In this case, the rivets 140 have a length equal to 4.85 mm.

The sizing of the chain 100 of FIG. 5 is also in this case such that the thickness of each outer and inner plate 121, 131 of the chain 100 at the end portions 121*a*, 131*a* thereof is smaller than the sum of the thicknesses of each outer plate 121 and of each inner plate 131 of two successive links 120, 130 at the central portions 120*b*, 130*b* of such links.

Figure 6:
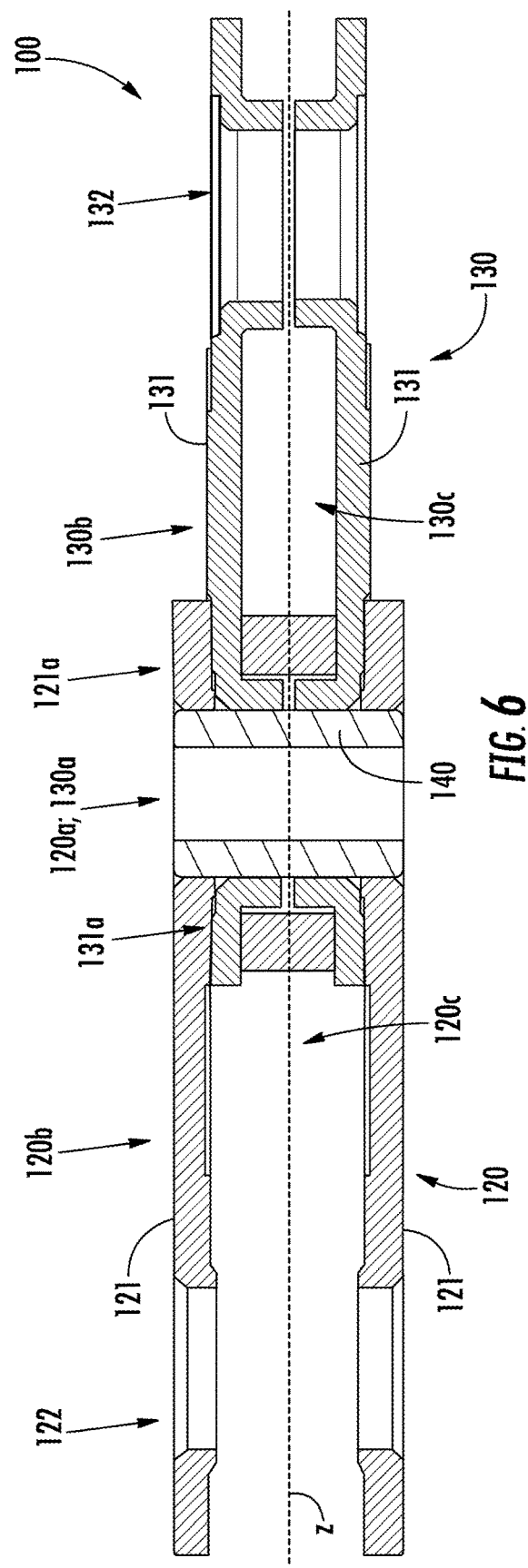
FIG. 6 is a schematic longitudinal section view of a chain according to a further embodiment of the present invention.
Figure 7:
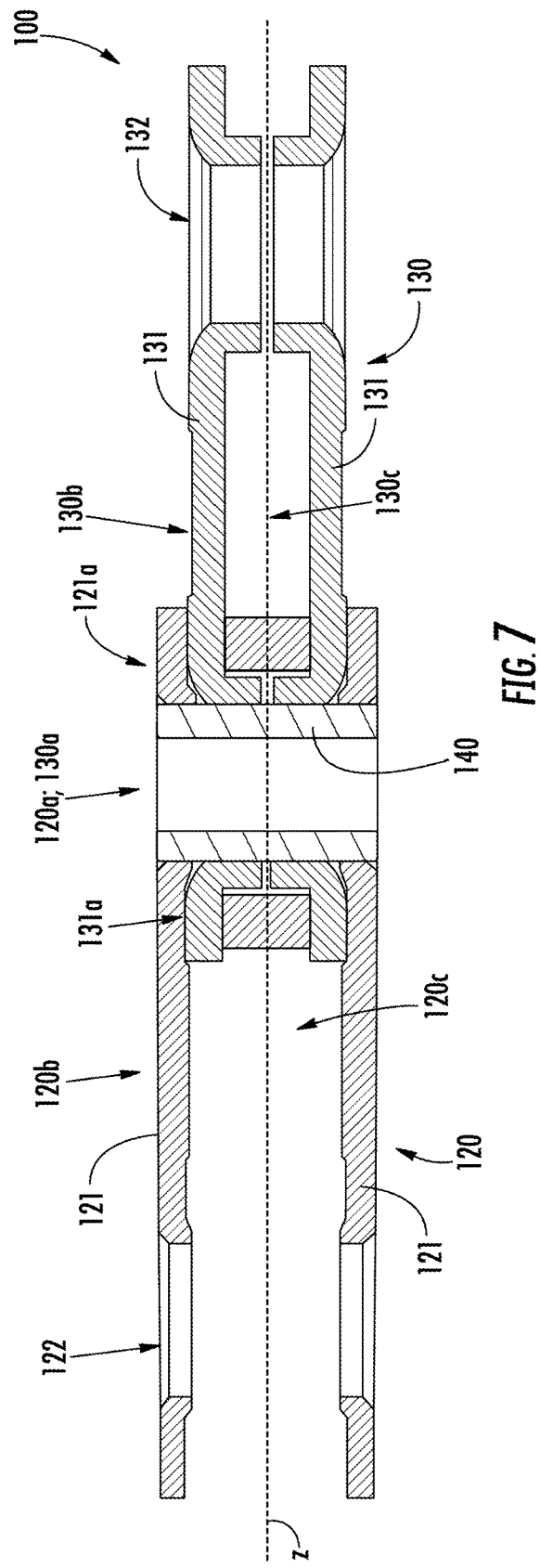
FIG. 7 is a schematic longitudinal section view of a chain according to a further embodiment of the present invention.
Figure 8:
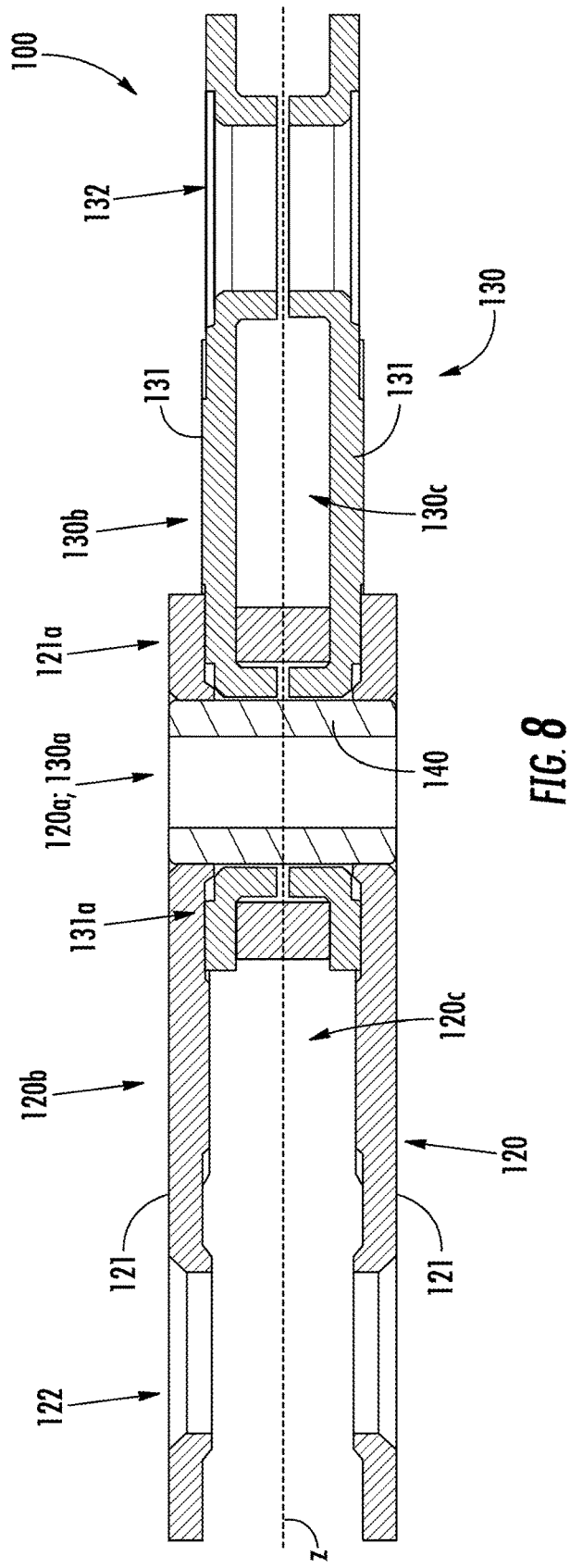
FIG. 8 is a schematic longitudinal section view of a chain according to a further embodiment of the present invention.

FIGS. 6-8 illustrate further embodiments of the chain 100 of the present invention. Such embodiments respectively differ from those of FIGS. 3-5 only with respect to the length of the rivets 140 which are used.

In particular, in the embodiments of FIGS. 6-8 rivets 140 having a length shorter than or equal to the distance between the outer surfaces of the outer plates 121 are used, so as not to protrude with respect to the outer plates 121 and, consequently, improve the gearshifting performance and reduce noise production.

Preferably, the end faces of the rivets 140 are flush with the outer surfaces of the plates 121. The length of the rivets 140 is therefore preferably equal to the maximum thickness of the chain 100.

Therefore, in the embodiments of FIGS. 6 and 7 the rivet 140 has a length equal to 5 mm, whereas in the embodiment of FIG. 8 the rivet 140 has a length equal to 4.7 mm.

The Applicant has carried out a number of laboratory tests on a chain 100 of the type illustrated in FIG. 3 and compared the results obtained with those obtained carrying out identical tests on the chain 10 described above with reference to FIG. 2. The chain 100 had a resistant transverse section smaller than that described above with reference to FIG. 3, so as to be in a worsened condition.

The chain 100 had a reduction in weight of 5.7% with respect to the chain 10. The teeth housing space in the inner link of the chain 100 had identical dimensions to that of the chain 10.

The tests highlighted that the tensile strength of the chain 100 is greater than 9000 N, as required by the standards.

The instability to lateral loads of the chain 100 is substantially equal to that of the chain 10, verifying that the section that collapsed due to instability was always a section of the central portion of the inner link, where the plates of the inner link of the chain 100 and of the chain 10 have identical thickness and identical distance from the longitudinal axis of symmetry of the chain.

The tests further highlighted only a slight worsening of the lateral rigidity under load, such worsening being according to the Applicant due to the reduced distance of the outer plates rather than to a weakening of the inner link.

The torsional and flexural strength was substantially identical to that of the chain 10.

The dry wear resistance was also substantially identical to that of the chain 10. Such resistance was measured on chains 100 and 10 that had the same area of contact between inner link and rivet.

Of course, those skilled in the art can bring numerous modifications and changes to the chain and to the motion transmission system described above, in order to satisfy specific and contingent requirements, all of which are in any case within the scope of protection of the present invention as defined by the following claims.

What is claimed is:

1. A bicycle chain comprising an alternate succession of outer links and inner link connected to each other at respective end portions thereof, each outer link and inner link comprising two plates arranged parallel to and spaced apart from one another to define a housing space for a tooth of a sprocket or toothed wheel, wherein:

each plate of each outer link has, at a central portion thereof, a first thickness;

each plate of each inner link has, at a central portion thereof, a second thickness;

each plate of each outer link and inner link has, at said respective end portions, a third thickness;

wherein said third thickness is less than a sum of said first thickness and said second thickness;

wherein each plate of each inner link has, at an end portion thereof, a thickness smaller than that at a central portion thereof.

2. The bicycle chain according to claim 1, wherein each plate of each outer link has, at an end portion thereof, a thickness greater than that at a central portion thereof.

3. The bicycle chain according to claim 1, wherein each plate of each inner link has, at an end portion thereof, a thickness smaller than that of the end portion of the corresponding plate of the outer link.

4. The bicycle chain according to claim 1, wherein each plate of each outer link has, at an end portion thereof, a thickness smaller than that at a central portion thereof.

5. The bicycle chain according to claim 4, wherein each plate of each outer link has, at an end portion thereof, a thickness smaller than that of the end portion of the corresponding plate of the inner link.

6. The bicycle chain according to claim 1, wherein each plate of each inner link has, at an end portion thereof, a thickness smaller than that at a central portion thereof and each plate of each outer link has, at an end portion thereof, a thickness smaller than that at a central portion thereof.

7. The bicycle chain according to claim 6, wherein each plate of each inner link has, at an end portion thereof, a thickness substantially equal to that of the end portion of the corresponding plate of the outer link.

8. The bicycle chain according to claim 1, wherein each plate of each outer link has an outer surface and an inner surface and an end connection portion of each outer link is rotatably coupled with a respective end connection portion of each inner link through a fastener having a length shorter than or equal to a distance between the outer surfaces of the plates of the outer link.

9. A motion transmission system for a bicycle, comprising a sprocket assembly configured to be mounted on a freewheel body of a hub of a bicycle rear wheel and a chain according to claim 1.

10. The motion transmission system according to claim 9, wherein said sprocket assembly comprises at least twelve sprockets.

11. The motion transmission system according to claim 10, wherein said sprocket assembly has an axial extension equal to 40.8 mm.

12. The motion transmission system according to claim 10, wherein a sprocket of said sprocket assembly has a thickness equal to 1.75 mm and the other sprockets of said sprocket assembly have a thickness equal to 1.5 mm.

13. The motion transmission system according to claim 9, wherein said sprocket assembly further comprises a plurality of spacers, each spacer is configured to be arranged between two consecutive sprockets and has a thickness equal to 2.05 mm.

14. The motion transmission system according to claim 9, wherein said sprocket assembly is a twelve sprocket assembly.

* * * * *